Nov. 17, 1931.  J. H. WILLIS  1,832,342
CHRONOLOGICAL DEVICE
Filed Nov. 2, 1929
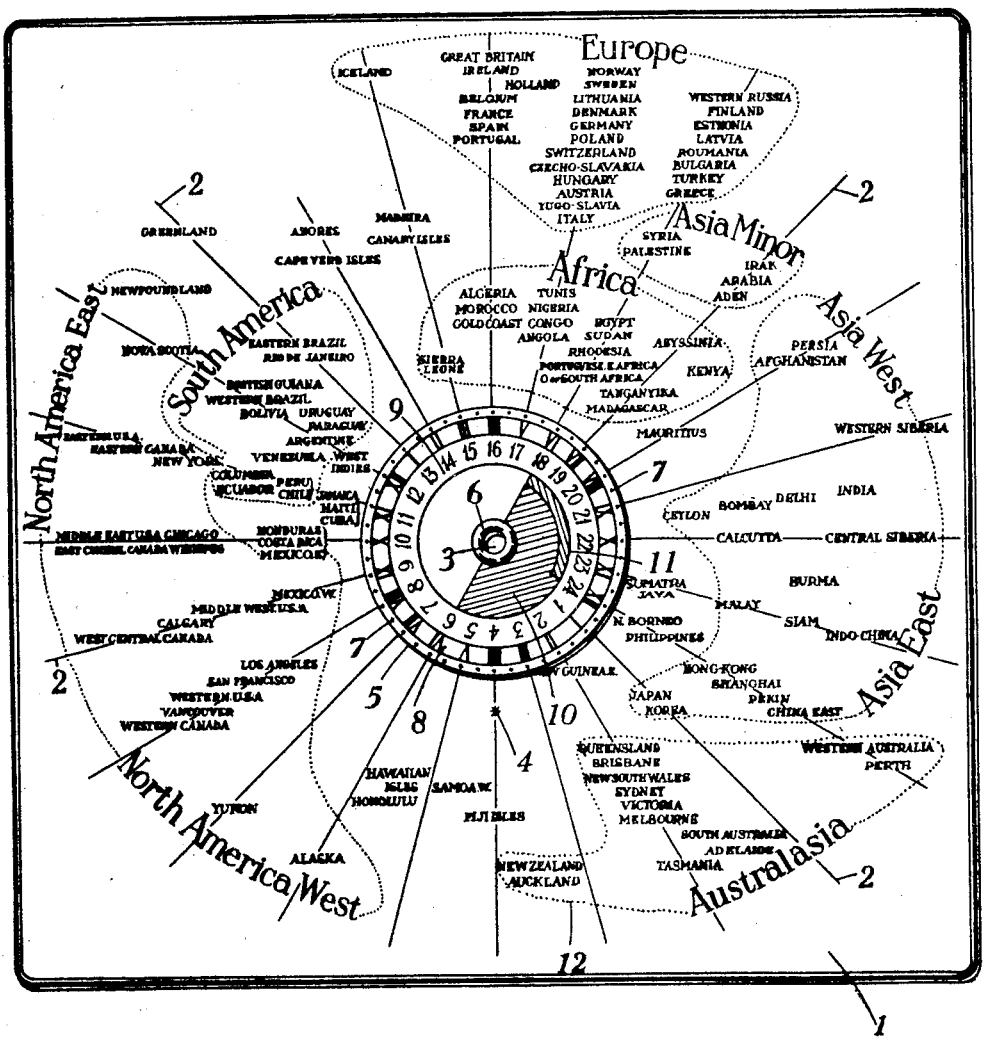
INVENTOR
John Henry Willis
BY
ATTORNEY Patented Nov. 17, 1931

1,832,342

UNITED STATES PATENT OFFICE

JOHN HENRY WILLIS, OF NORWICH, ENGLAND

CHRONOLOGICAL DEVICE

Application filed November 2, 1929, Serial No. 404,467, and in Great Britain January 21, 1929.

The object of this invention is to provide a device for determining, at any moment world times everywhere, and particularly adapted to determining instantly the local time for receiving any wireless programme or event being anywhere broadcast or televised throughout the world, and for such business purposes as the timing of cables and wireless phone calls and international intercourse in general.

The device however is not restricted to such uses, as it might, for example, be employed as an educational appliance, or for denoting to shipping the moment of day or night each S. O. S. call will reach all lands, or for almanacing the position of all hours round the world.

The device comprises a time-dial marked with the 24 hours of day and night, and such minor divisions as are desired, made to revolve clockwise or anti-clockwise, by hand or mechanically, upon a chart at the centre of a plurality of radiating lines of meridian set out in a plane. Such lines of meridian, however, are not the normal geographic or solar meridians in use on globes or maps or devices employing time-dials on charts such as those described in specifications Nos. 649,198 or 776,297 for showing the geographical positions and solar times of places, and differing only from each other in the means whereby they achieve it. The meridians in the present device are arranged to denote instead, meridians of standard or adopted time; with meridians of places set out upon them to denote the places that have elected to adopt those meridians as their meridians of standard or adopted time instead of their true geographic meridians or solar times; the places being removed for that purpose from their actual geographic or solar meridians as set out on globes, maps and time charts hitherto. So that whereas, for example, on former maps, globes or time-charts, Belgium must necessarily be shown on a meridian to the east of England, and Ireland on a meridian to the west, all the three countries on the chart constructed on the new principle of this present invention, must appear on the same meridian; the object of the device being to show, not the solar times indicated by meridians on globes, maps and time-charts (which often only approximate and often differ widely from standard time, and which in practice are now abandoned practically throughout the world) but instead the actual time arbitrarily adopted and employed by all countries, and needing to be known exactly for the purpose of timing exactly all wireless phone calls and modern international intercourse. The time dial is constructed to this end with twin time notations, for universal use, with light and dark sections to indicate readily the hours of day and night, and a special distinctive band to indicate any moment all countries broadcasting their evening programmes; the relative positions of the dial and chart being such, that when for example it is noon at any place, if noon on the dial is turned to that place, the exact standard or adopted time at that moment shall be indicated by the dial in all places in the world.

The place names furthermore are set out on this new type of meridian on a new principle. For whereas in former time charts names have been set out in parallel to their lines of solar meridians, so that the names in consequence must necessarily appear at varying angles on the charts and in confusion, the names by this new principle are placed at varying angles to these standard meridians so as to be all horizontal to a given base. Since the relative geographic positions of countries and places to one another need no longer be preserved on a chart devised on this principle, the names furthermore can be shifted upon these meridians so as to classify or index or group them into areas with those with which they may stand in geographic or any other relationship, for facilitating reference from any standpoint desired.

One constructional embodiment of the invention is hereinafter described, by way of example, with reference to the annexed drawing.

The device comprises a chart 1 on which are marked 24 main lines, 2, of meridians of standard time radiating from a focal point, 3 arranged at, or near the centre of the chart, the lines being spaced equidistantly round said point. Each line of meridian is marked with the name or names of the countries or places adopting such meridian as their meridian of standard or adopted time; an asterisk 4 marking the meridian where each day first begins. A disk, 5, is arranged on the chart and is adapted to be rotated relatively thereto about a pivotal member, 6, whose axis is coincident with the focal point, the said disk being provided with a knob or eyelet or milled circumference whereby it may be turned about the pivot. The disk is marked with an outer ring 8 of numerals denoting the hours of 1 a. m. to 12 noon and 1 p. m. to 12 midnight. A second ring 9 of numerals 1 to 24 is also marked on the disk within the outer ring, each numeral being opposite to the corresponding numeral in the outer ring. The numerals in the inner ring are provided for users of the device who adopt the 0-24 hours daily time notation. In order more clearly to differentiate the hours of daylight from those of darkness, a black sector, 10 is provided within the inner ring of numerals, the base of the sector being coincident with the radii against which the 6 p. m. to 6 a. m. indications are provided. The hours of a normal evening wireless programme (6 p. m. to 12 midnight) are also clearly indicated on the disk by a red arcuate band, 11, provided in juxtaposition to the 6 p. m. to 12 midnight indications upon the black sector of the dial.

Assuming for the purpose of description, that the user of the device is aware that a broadcast transmission is to take place from New York at 11 a. m., and that he is desirous of ascertaining when he must listen-in in Great Britain to receive the programme, he first turns the said disk until the 11 a. m. graduation thereon is coincident with the line of meridian against which the words "New York" are marked. By then observing which numeral in the outer ring, 8, of numerals on the disk is opposite to the line of meridian against which "Great Britain" is marked, the user is able to read off at once the desired hour for listening-in. Further, the local time or standard time corresponding to 11 a. m. in New York for any other country on the chart can at once be ascertained by observing which numeral in either of the rings, 8 or 9, of numerals is opposite the line of meridian against which the name of the country is marked. In like manner, if a telephone call was timed for any hour in any land, for example, 4 p. m. in Germany; by turning the figure of 4 p. m. to Germany, the hour at which the call should be made from any or all other countries is shown by the figures on the disk respectively against them. When the actual time is turned to the country one is in, the red arcuate band, 11, on the disk will show to the user which countries are at the time broadcasting their evening broadcast programmes.

It will be understood that the constructional details of the invention may be varied. More than 24 lines of meridian, 2, may, for example, obviously be provided on the chart, or the device could be made to operate for a small section only of the world, such as the United States of America, with details of every State or city grouped into their respective zones of standard or adopted time, in order to show what hour or time in any place corresponds to the hour or time in any other. The device could also be issued in clock form, so that an anti-clockwise revolution of the dial on such a chart, would, as the hours passed from meridian to meridian, show at every moment the exact standard or adopted time everywhere throughout the world.

In order to assist the user of the device quickly to locate any desired country or place, the countries and places are grouped together on the chart according to the particular continents or areas in which they are situated, showing in the construction described above, nine groups of countries or places arranged within boundary lines or areas, 12, marked on the chart, and indicated respectively by the words "Europe", "Asia Minor", "Asia west," "Asia east", "Africa", "Australasia", "North America west", "North America east", "South America".

I claim:—

A chronological device comprising a chart member provided with a plurality of lines of meridian radiating from a central field, representing not the customary geographical lines of solar meridians as used on maps and globes and charts, but meridians of Standard or adopted time, each marked with the names of the country or countries or place or places adopting such meridians as their meridians of Standard or adopted time; said names being grouped and placed upon lines of meridian so as to group them into areas with others with which they may stand in any geographic or other relationship desired for simplicity of reference; and a member arranged turnably clockwise and anti-clockwise on the first mentioned member, and provided with graduations denoting the hours or time of day and night, the arrangement being such that the hour or time in one country or place corresponding to a given hour or time in a country or place elsewhere or foreign thereto, can be readily determined simply by setting the graduation on the turnable member corresponding to the foreign hour, opposite to the line of meridian marked with the name of the foreign country or place, noting the position at which the line of meridian marked with the name of the first mentioned country or place coincides with the turnable member, the said turnable member having an arcuate band to denote the duration of a normal evening broadcast programme.

JOHN HENRY WILLIS.